United States Patent
Pan (10) Patent No.: US 9,748,807 B2
(45) Date of Patent: Aug. 29, 2017

(54) MOTOR (71) Applicant: Zhongshan Broad-Ocean Motor Manufacturing Co., Ltd., Zhongshan (CN)

(72) Inventor: Mingpan Pan, Zhongshan (CN)

(73) Assignee: ZHONGSHAN BROAD-OCEAN MOTOR MANUFACTURING CO., LTD., Zhongshan (CN)

( * ) Notice: Subject to any disclaimer, the term of this patent is extended or adjusted under 35 U.S.C. 154(b) by 69 days.

(21) Appl. No.: 14/842,811

(22) Filed: Sep. 1, 2015

(65) Prior Publication Data
US 2015/0372549 A1    Dec. 24, 2015

Related U.S. Application Data (63) Continuation-in-part of application No. 13/571,382, filed on Aug. 10, 2012, now abandoned, which is a
(Continued)

(30) Foreign Application Priority Data

Aug. 11, 2011  (CN) .................... 2011 2 0290991 U
Oct. 19, 2011  (CN) .................... 2011 2 0398810 U (51) Int. Cl.
H02K 1/27  (2006.01)
H02K 1/14  (2006.01)
(Continued)

(52) U.S. Cl.
CPC ............ *H02K 1/2773* (2013.01); *H02K 1/06* (2013.01); *H02K 1/146* (2013.01); *H02K 21/16* (2013.01);
(Continued)

(58) Field of Classification Search
CPC ... H02K 1/08; H02K 1/146; H02K 1/27; H02K 1/276; H02K 1/2766; H02K 1/2773;
(Continued)

(56) References Cited

U.S. PATENT DOCUMENTS

3,942,055 A * 3/1976 Hoffmeyer ............... H02K 3/28
                                                    310/184
5,220,228 A * 6/1993 Sibata .................... H02K 21/16
                                                    310/156.46
(Continued)

*Primary Examiner* — Tran Nguyen
(74) *Attorney, Agent, or Firm* — Matthias Scholl P.C.; Matthias Scholl (57) ABSTRACT

A motor including a stator assembly and a rotor assembly. The stator assembly includes a stator core and a winding; the stator core includes a yoke and a plurality of teeth protruding inwards from the yoke; between two adjacent teeth formed is a winding slot; the winding is arranged in the winding slot, and winded on the teeth. The rotor assembly includes a rotor core and a permanent magnet. The rotor core includes an annular ring having a central axial bore and a plurality of magnetic induction blocks protruding outwards from an outer side of the annular ring. Between two adjacent magnetic induction blocks formed is a radial recess for mounting the permanent magnet. The magnetic induction blocks at both sides of an opening of the radial recess protrude with a hook block. The thickness of the rotor core is larger than that of the stator core.

20 Claims, 8 Drawing Sheets

Related U.S. Application Data continuation-in-part of application No. 13/292,054, filed on Nov. 8, 2011, now abandoned.

(51) Int. Cl.
 *H02K 21/16* (2006.01)
 *H02K 1/06* (2006.01)

(52) U.S. Cl.
 CPC ..... *H02K 2201/03* (2013.01); *H02K 2213/03* (2013.01)

(58) Field of Classification Search
 CPC ........ H02K 1/185; H02K 21/16; H02K 21/22; H02K 29/03
 See application file for complete search history.

(56) References Cited

U.S. PATENT DOCUMENTS

| | | | | |
|---|---|---|---|---|
| 5,939,810 | A * | 8/1999 | Uchida | H02K 1/2773 310/156.57 |
| 6,867,525 | B2 * | 3/2005 | Ionel | H02K 1/2733 310/156.47 |
| 6,891,299 | B2 * | 5/2005 | Coupart | H02K 11/25 310/152 |
| 6,911,756 | B1 * | 6/2005 | Chang | H02K 1/278 310/156.01 |
| 2009/0033174 | A1 * | 2/2009 | Niguchi | H02K 1/278 310/216.001 |
| 2010/0066197 | A1 * | 3/2010 | Futami | H02K 1/146 310/208 |

\* cited by examiner

MOTOR

CROSS-REFERENCE TO RELATED APPLICATIONS

This application is a continuation-in-part of, and claims domestic priority benefits to U.S. patent application Ser. No. 13/571,382, filed Aug. 10, 2012, now pending. U.S. patent application Ser. No. 13/571,382, filed Aug. 10, 2012, now pending, is a continuation-in-part of, and claims domestic priority benefits to U.S. patent application Ser. No. 13/292,054, filed Nov. 8, 2011, now pending, and claims the benefit of Chinese Patent Application No. 201120290991.3, filed Aug. 11, 2011 and Chinese Patent Application No. 201120398810.9, filed Oct. 19, 2011. The contents of all of the aforementioned applications, including any intervening amendments thereto, are incorporated herein by reference in their entirety.

BACKGROUND OF THE INVENTION

Field of the Invention
The invention relates to a motor.
Description of the Related Art
A conventional motor includes a stator assembly and a rotor assembly. The stator assembly includes a stator core and a winding, and the rotor assembly includes a rotor core and a permanent magnet mounted in the rotor core. The thickness of the rotor core is equal to that of the stator core. Such a structure has the disadvantage of bad magnetic accumulation effect, and the power cannot meet high requirements. Generally, in order to meet the requirements of high power, the thickness of the rotor core and the stator core is increased, or other strong magnetic materials are employed, however, such methods would result in a large size of the motor, high cost, and lower the competitiveness.

SUMMARY OF THE INVENTION

In view of the above-described problems, it is one objective of the invention to provide a motor that has a simple structure, small size, potent magnetic accumulation effect, and low cost.

To achieve the above objective, in accordance with one embodiment of the invention, there is provided a motor comprising a stator assembly and a rotor assembly inserted into the stator assembly. The stator assembly comprises a stator core and a winding; the stator core comprises a yoke and a plurality of teeth protruding inwards from the yoke; between two adjacent teeth formed is a winding slot; the winding is arranged in the winding slot, and winded on the teeth. The rotor assembly comprises a rotor core and a permanent magnet; the rotor core comprises an annular ring having a central axial bore and a plurality of magnetic induction blocks protruding outwards from an outer side of the annular ring; a radial recess is formed by two opposing side surfaces of two adjacent magnetic induction blocks, respectively, and a portion of the outer side of the annular ring is surrounded by the two opposing side surfaces; the permanent magnet is mounted in the radial recess; the portion of the outer side of the annular ring forms an innermost end of the radial recess; the magnetic induction blocks at both sides of an opening of the radial recess protrude with a hook block; and the thickness of the rotor core is larger than the thickness of the stator core.

In a class of this embodiment, a distance between the two hook blocks arranged at the opening of the same radial recess is between $\pi D*4/(36*2P) - \pi D*6/(36*2P)$, in which D is the maximum external diameter of the rotor core, P is the number of the pole pairs of the rotor assembly.

In a class of this embodiment, a boss is arranged at the middle of the innermost end of the radial recess and protrudes toward the opening of the radial recess.

In a class of this embodiment, the boss comprises a top part and a bottom part, and the top part is disposed on the bottom part. The top part is in a shape of a semi-sphere, and the bottom part is in a substantially cylindrical shape. The permanent magnet is mounted on the top point of the top part and is spaced from the innermost end of the radial recess by the boss, and two cavities are formed between the permanent magnet and the innermost end of the radial recess.

In a class of this embodiment, a distance between a bottom of the permanent magnet and the innermost end of the radial recess is larger than or equal to 2 mm.

In a class of this embodiment, the thickness difference between the rotor core and the stator core is 3-50 mm.

In a class of this embodiment, the thickness difference between the rotor core and the stator core is 3-20 mm.

In a class of this embodiment, the thickness difference between the rotor core and the stator core is 3-10 mm.

In a class of this embodiment, the section of an outer side surface of the magnetic induction blocks is a circular-arc line and the outer side surface employs a point with a distance deviating from the center of the central axial bore as a center of circle.

In a class of this embodiment, the section of an inner side surface of the tooth comprises an outer arc line bending inwards in the center and outer cutting edges at both sides, and the inner side surface of the tooth matches the outer side surface of the magnetic induction block.

In a class of this embodiment, the outer arc line is a circular-arc line.

In a class of this embodiment, the outer edge of the section of the stator core comprises a plurality of tangent lines, and a mounting hole is arranged on the stator core near the tangent lines.

Advantages of the motor of the invention are summarized below:

1) the thickness of the rotor core is larger than the thickness of the stator core, the motor has a simple structure, small size, potent assembled magnetic effect, and low cost;
2) the section of the outer side surface of the magnetic induction blocks is a circular-arc line and the outer side employs a point with a distance deviating from the center of the central axial bore as the center of circle. Such structure is helpful to reduce magnetic leakage of the rotor core, lower cogging torque ripple, and achieve a big counter-electromotive force constant and smooth waveform of the counter-electromotive force. Therefore, the motor's performance has been improved and losses have been reduced;
3) A distance between the two hook blocks arranged at the opening of the same radial recess is between $\pi D*4/(36*2P) - \pi D*6/(36*2P)$, in which D is the maximum external diameter of the iron core, P is the number of the pole pairs of the rotor assembly. This structural arrangement of the hook blocks ensures that substantially all of the magnetic field generated by the iron core is absorbed by the permanent magnet which is disposed between the hook blocks. Thus, this structural arrangement of the hook blocks reduces magnetic leakage of the rotor core, lowers cogging torque ripple, and achieves a relatively large counter-electromotive force constant and a relatively smooth waveform of the counter-electromotive force; and 4) the section of the inner side surface of the tooth comprises an outer arc line bending inwards in the center and outer cutting edges at both sides, and the inner side surface of the tooth matches the outer side surface of the magnetic induction block, and the outer arc line is a circular-arc line. A boss having a semi-spherical top part and a cylindrical bottom part is arranged at the middle of the innermost end of the radial recess, and a distance between a bottom of the permanent magnet and the innermost end of the radial recess is larger than or equal to 2 mm. Therefore, the magnetic leakage has been further reduced, and cogging torque ripple has been lowered.

DETAILED DESCRIPTION OF THE EMBODIMENTS

The invention is explained in further detail below with reference to the accompanying drawings and examples.

As shown in FIGS. 1-8, a motor comprises a stator assembly and a rotor assembly inserted into the stator assembly. The stator assembly comprises a stator core 1 and a winding; the stator core 1 comprises a yoke 10 and a plurality of teeth 11 protruding inwards from the yoke 10; between two adjacent teeth 11 formed is a winding slot 12; the winding is arranged in the winding slot 12, and winded on the teeth 11. The rotor assembly comprises a rotor core 2 and a permanent magnet 3; the rotor core 2 comprises an annular ring 22 having a central axial bore 21 and a plurality of magnetic induction blocks 23 protruding outwards from an outer side of the annular ring 22. A radial recess 24 is formed by two opposing side surfaces of two adjacent magnetic induction blocks 23, respectively, and a portion of the outer side of the annular ring 22 is surrounded by the two opposing side surfaces. The permanent magnet 3 is mounted in the radial recess 24, and the portion of the outer side of the annular ring 22 forms an innermost end of the radial recess 24.

The magnetic induction blocks 23 at both sides of an opening 25 of the radial recess 24 protrude with a hook block 26; the thickness L2 of the rotor core 2 is larger than the thickness L1 of the stator core 1; the thickness difference between the rotor core and the stator core is 3-50 mm; the thickness difference between the rotor core and the stator core is 3-20 mm; the thickness difference between the rotor core and the stator core is 3-10 mm; the section of an outer side surface 231 of the magnetic induction blocks 23 is a circular-arc line and the outer side surface 231 employs a point A with a distance H deviating from the center O of the central axial bore 21 as a center of circle; the section of an inner side surface of the tooth 11 comprises an outer arc line 110 bending inwards in the center and outer cutting edges 111 at both sides, and the inner side surface of the tooth 11 matches the outer side surface of the magnetic induction block 23; the outer arc line 110 is a circular-arc line; the outer edge of the section of the stator core 1 comprises a plurality of tangent lines 13, and a mounting hole 14 is arranged on the stator core 1 near the tangent lines.

The distance L3 between the two hook blocks 26 arranged at the opening of the same radial recess 24 is between $\pi D*4/(36*2P)-\pi D*6/(36*2P)$, in which D is the maximum external diameter of the rotor core 2, P is the number of the pole pairs of the rotor assembly. This structural arrangement of the hook blocks ensures that substantially all of the magnetic field generated by the iron core is absorbed by the permanent magnet which is disposed between the hook blocks. Thus, this structural arrangement of the hook blocks reduces magnetic leakage of the rotor core, lowers cogging torque ripple, and achieves a relatively large counter-electromotive force constant and a relatively smooth waveform of the counter-electromotive force.

As shown in FIGS. 1-2, 4, and 8, a boss 42 is arranged at the middle of the innermost end of the radial recess 24 and protrudes toward the opening of the radial recess 24. The boss 42 comprises a top part 421 and a bottom part 422, and the top part 421 is disposed on the bottom part 422. The top part 421 is in a shape of a semi-sphere, and the bottom part 422 is in a substantially cylindrical shape. The permanent magnet 5 is mounted on the top point of the top part 421 and is spaced from the innermost end of the radial recess 4 by the boss 42, and two cavities are formed between the permanent magnet 5 and the innermost end of the radial recess 4. The permanent magnet 3 is only in contact with the top point of the top part 421; and except for the middle point of the permanent magnet 3 which is in contact with the boss 42, the permanent magnet 3 is spaced from the rotor core with substantially the same distance. The distance L4 between the bottom of the permanent magnet 3 and the innermost end of the radial recess 24 is larger than or equal to 2 mm. In other words, the distance between the top point of the top part 421 and the innermost end of the radial recess 24 is larger than or equal to 2 mm. Such structural arrangement of the boss 42 and the permanent magnet 3 ensures a substantially uniform magnetic insulation of the permanent magnet rotor and reduces magnetic leakage from the rotor core.

Figure 1:
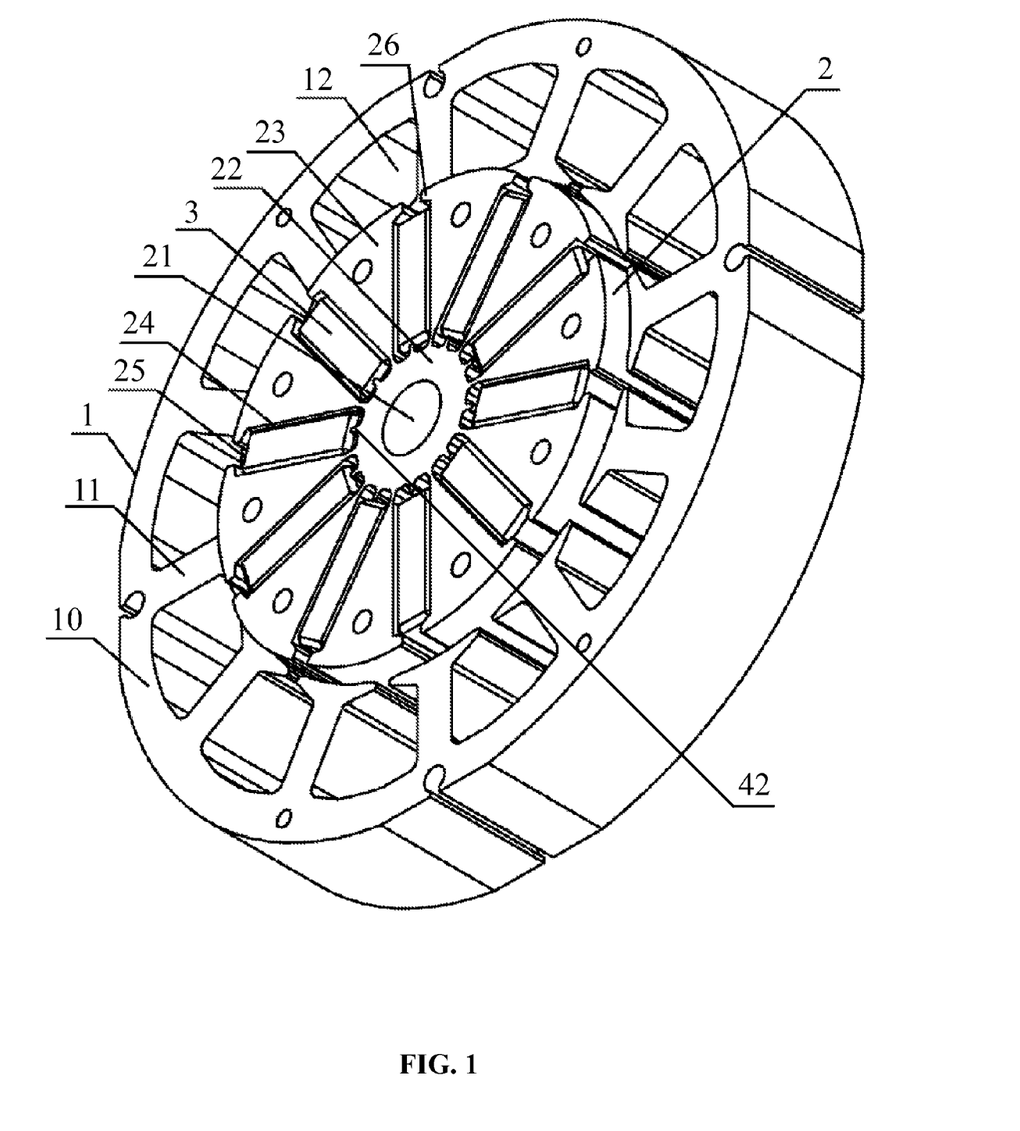
FIG. 1 is a stereogram of a motor according to one embodiment of the invention.
Figure 2:
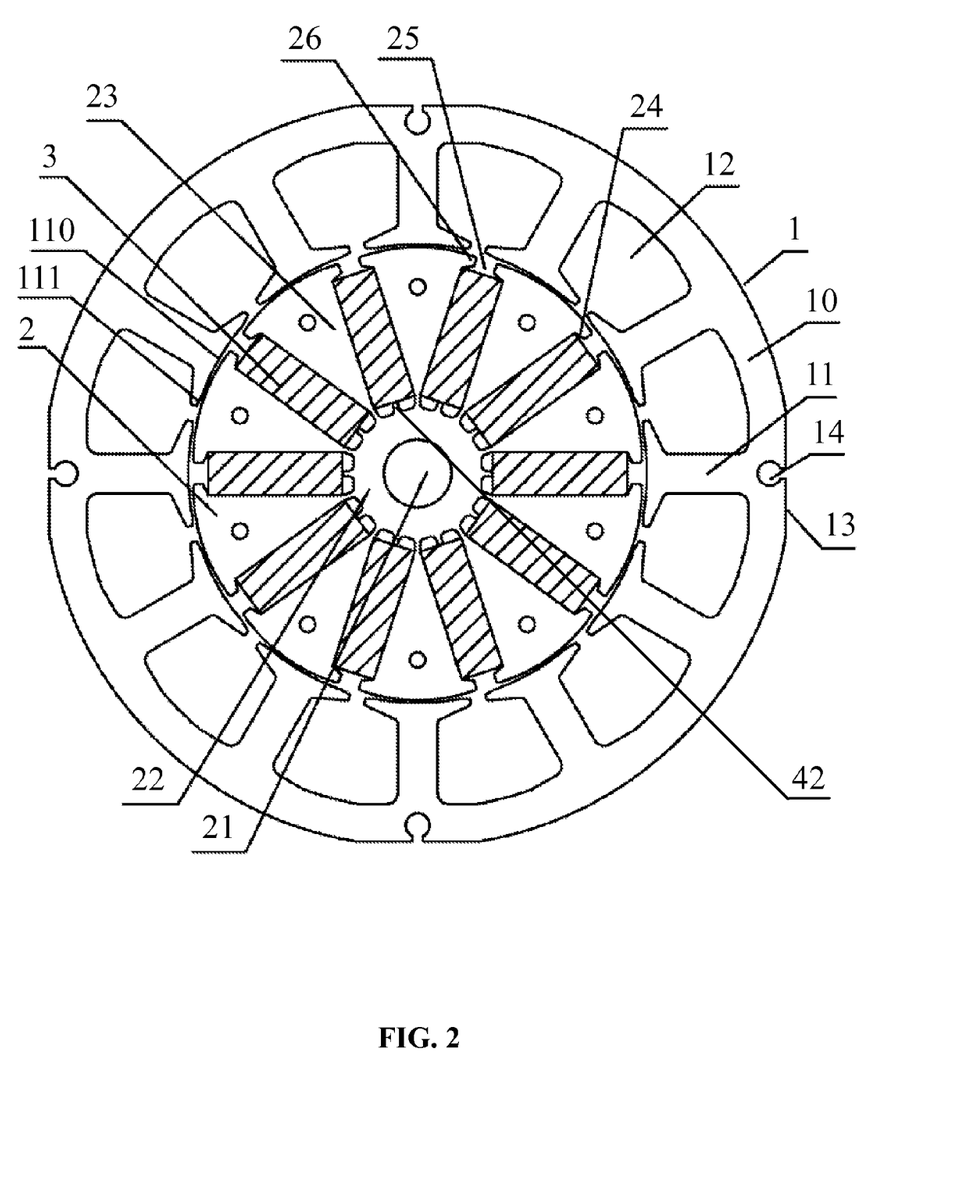
FIG. 2 is a schematic diagram of a motor according to one embodiment of the invention.
Figure 3:
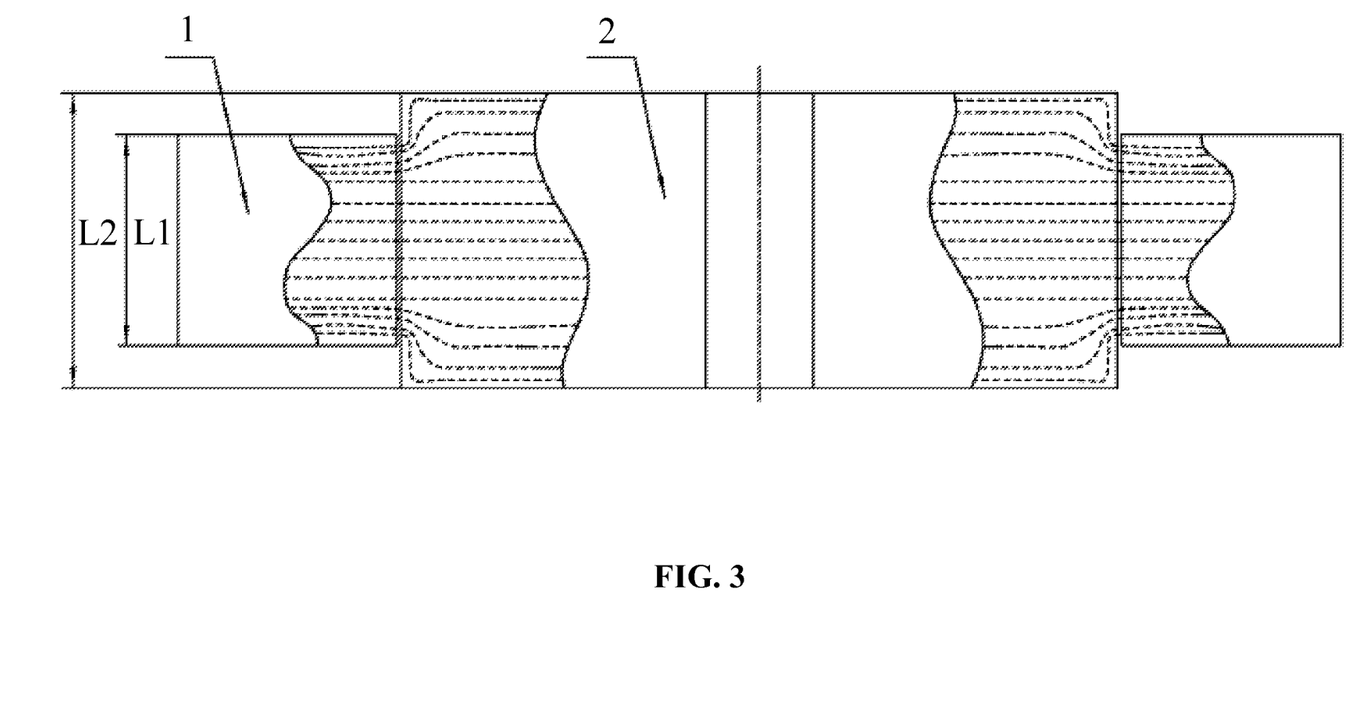
FIG. 3 is a schematic diagram of magnetic accumulation structures of a rotor and a stator according to one embodiment of the invention.
Figure 4:
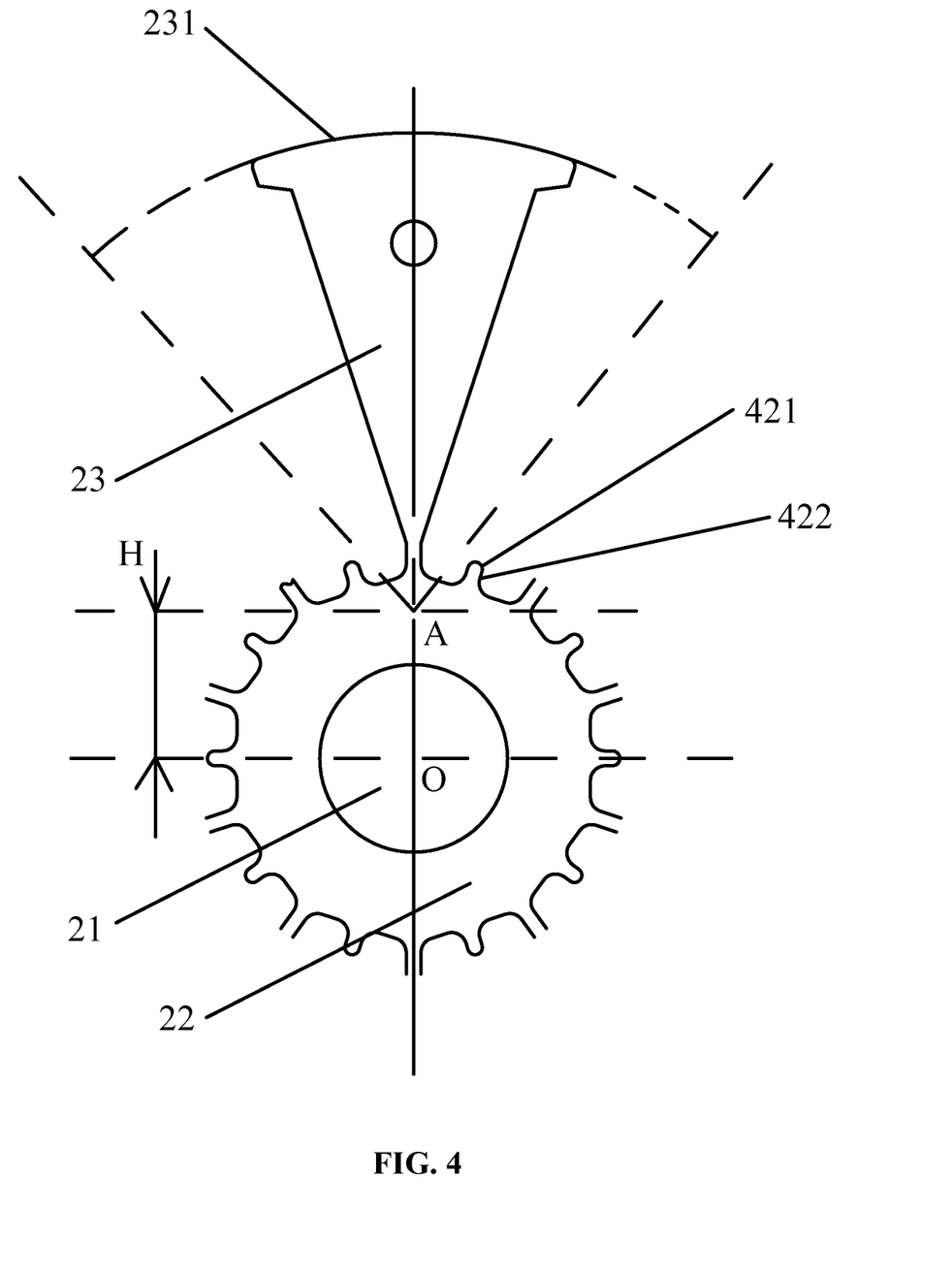
FIG. 4 is a local enlarged view of a rotor core according to one embodiment of the invention.
Figure 5:
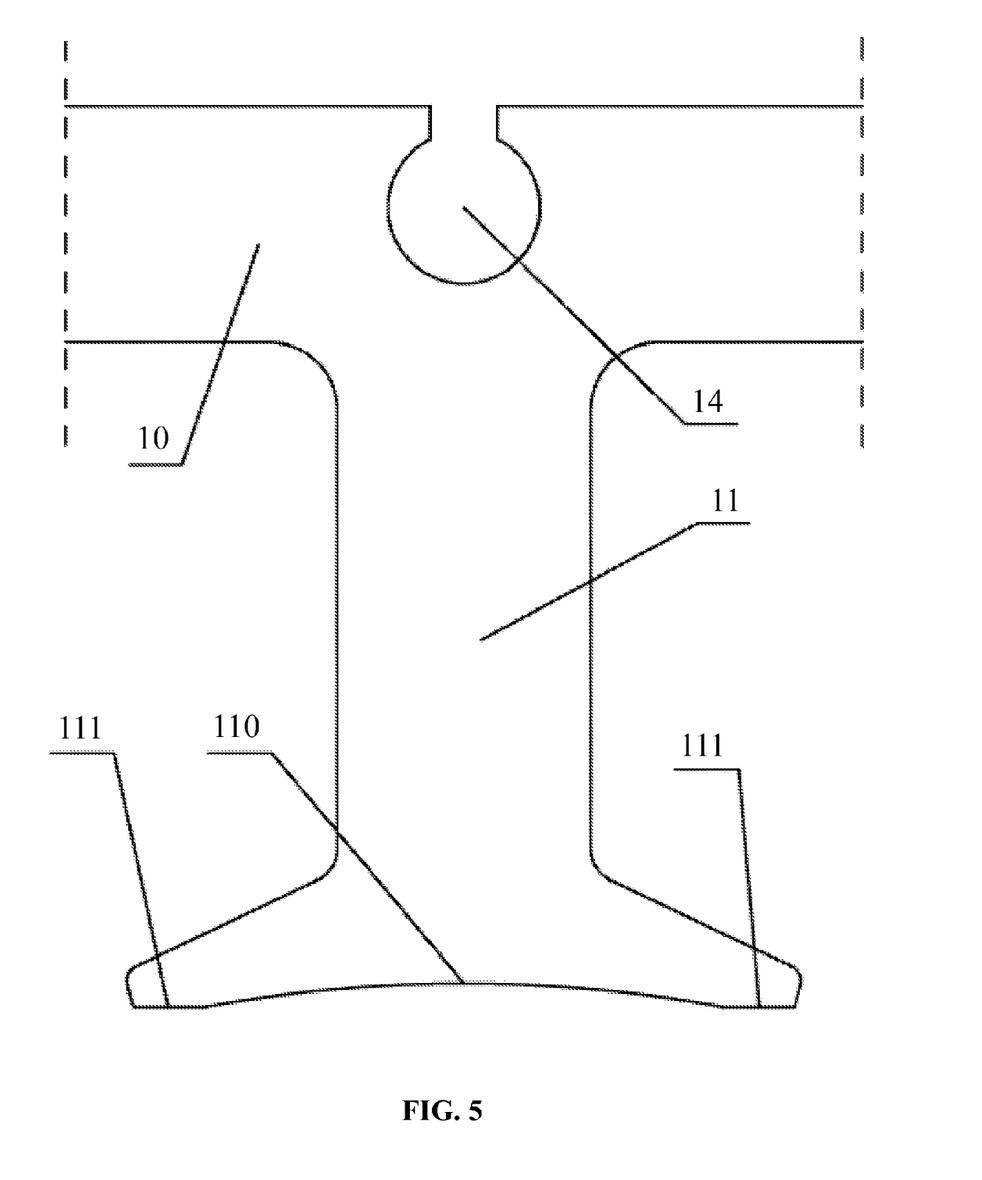
FIG. 5 is a local enlarged view of a stator core according to one embodiment of the invention.
Figure 6:
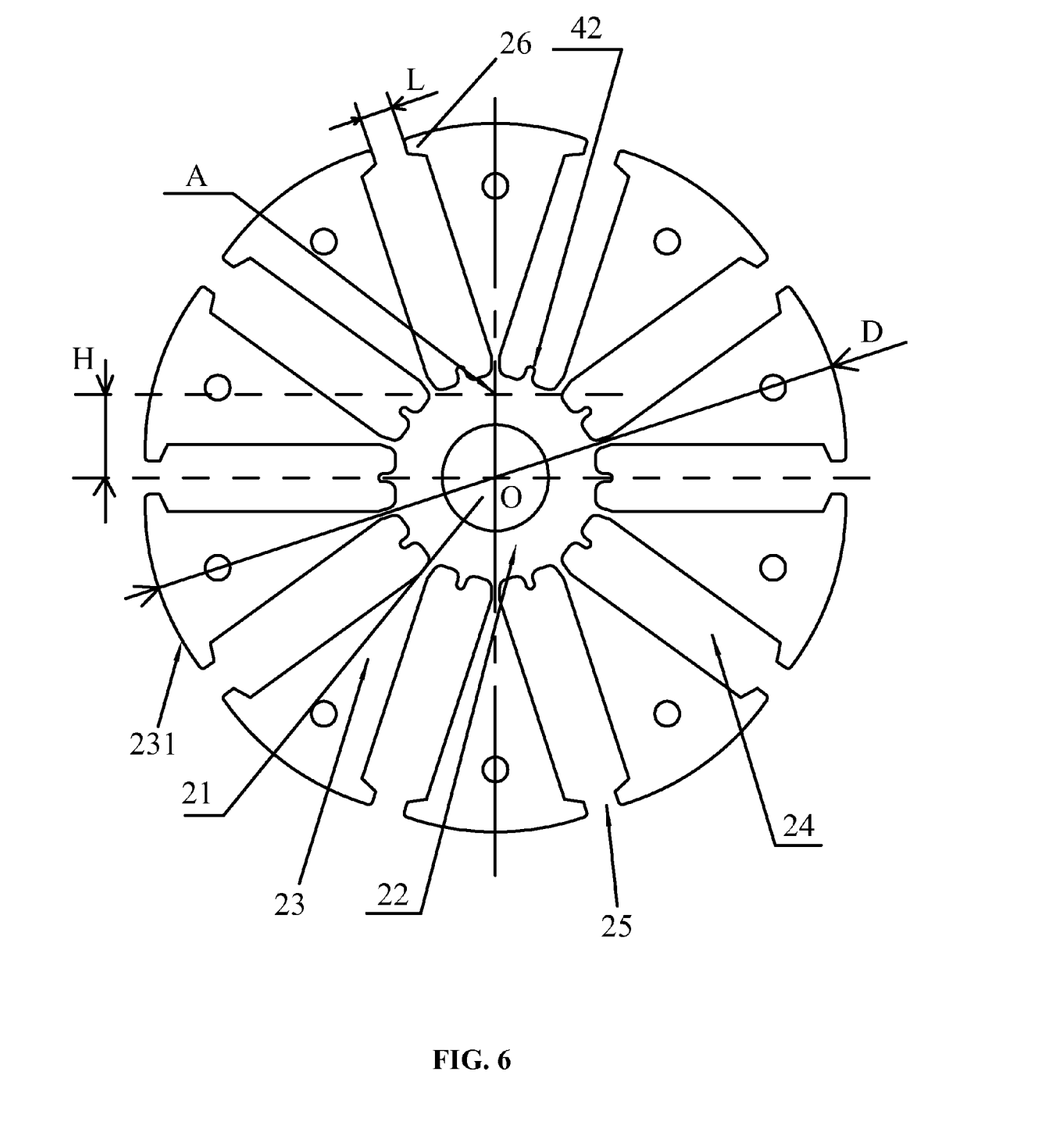
FIG. 6 is a schematic diagram of the rotor core according to one embodiment of the invention.
Figure 7:
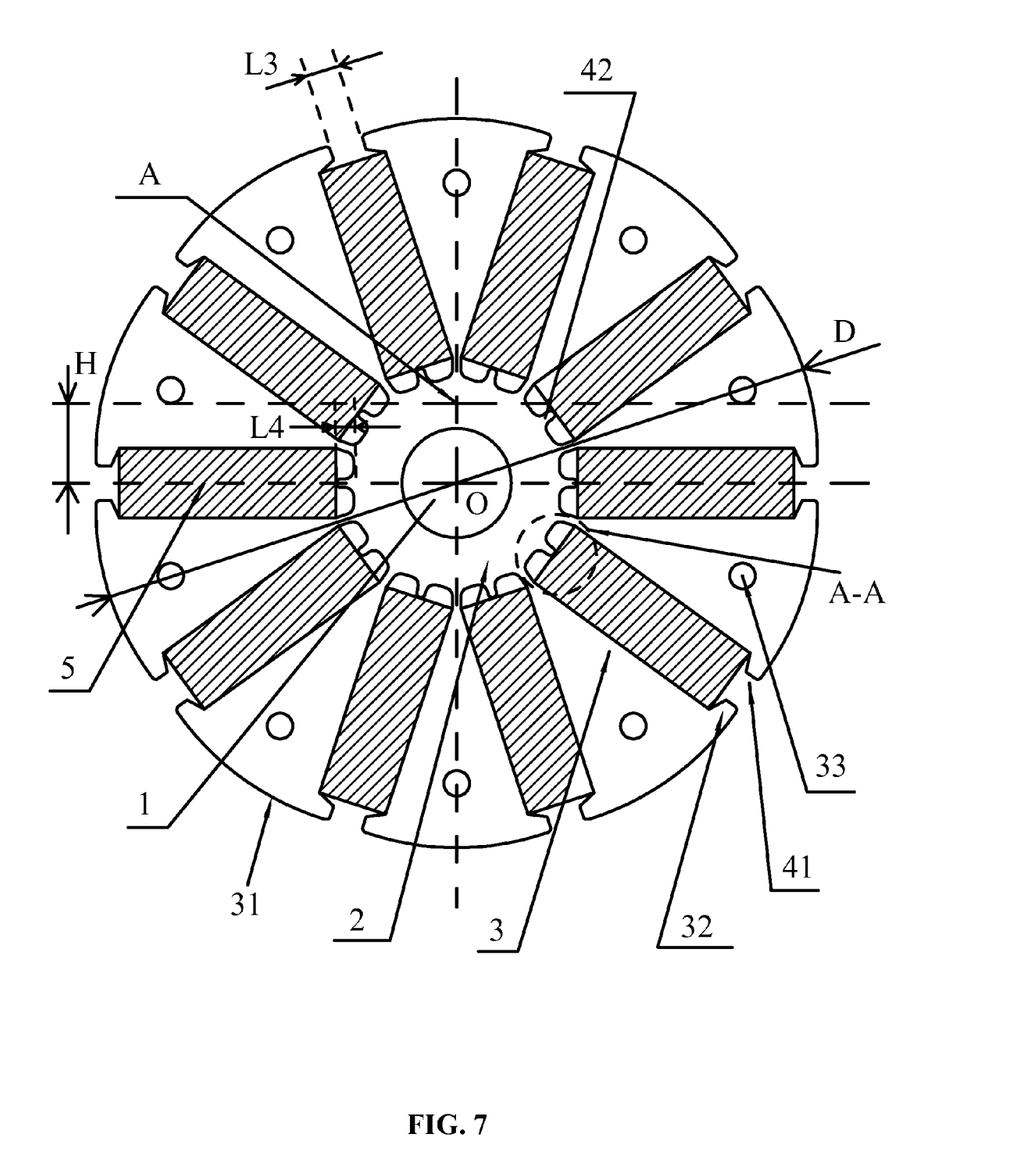
FIG. 7 is a schematic diagram of the rotor according to one embodiment of the invention.
Figure 8:
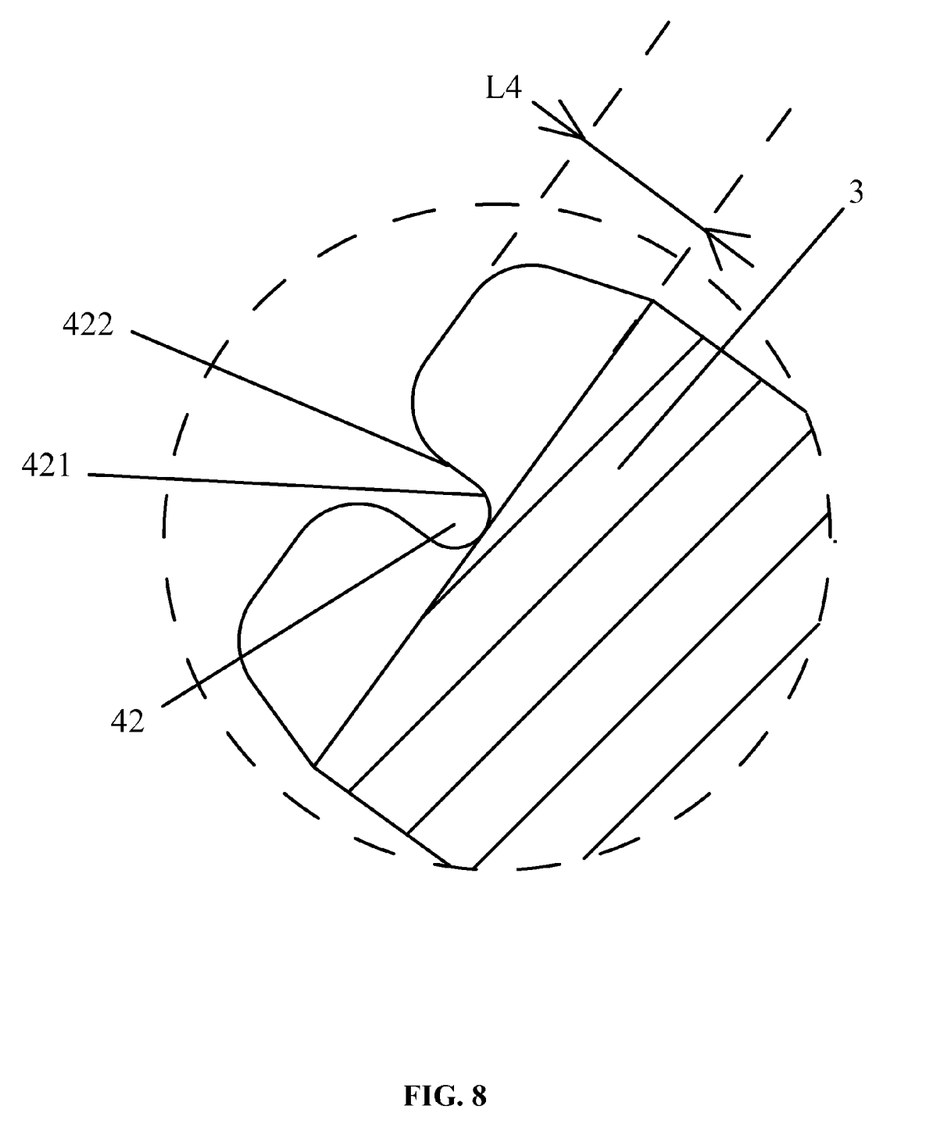
FIG. 8 is a partial enlarged view taken from line A-A of FIG. 7 according to one embodiment of the invention.

As shown in FIG. 3, dash lines mean the magnetic field lines, the rotor core has high permeability in radial direction, as well as in axial direction, thus, taking advantage of this structure, the increase of the magnetic flux in the air gap can be realized by increasing the length of the rotor core and the magnet steel in the axial direction. An extra part of the magnet steel, by which the magnetic steel is thicker than the stator core, can produce magnetic flux in the stator and rotor cores through the magnetic accumulation effect of the rotor core in the axial direction. In the condition that the magnetic flux of stator and rotor cores is unsaturated, the magnetic flux produced by the extra part of the magnet steel is mostly accumulated besides a normal magnetic flux leakage. Thus, the invention has a good effect of magnetic accumulation, not only hasn't it increased the thickness of the stator and the size of the motor, but also it has lowered the cost of the motor.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A motor, comprising a stator assembly and a rotor assembly inserted into the stator assembly, wherein
   the stator assembly comprises a stator core and a winding;
   the stator core comprises a yoke and a plurality of teeth protruding inwards from the yoke;
   between two adjacent teeth formed is a winding slot;
   the winding is arranged in the winding slot, and wound on the teeth;
   the rotor assembly comprises a rotor core and a permanent magnet;
   the rotor core comprises an annular ring having a central axial bore and a plurality of magnetic induction blocks protruding outwards from an outer side of the annular ring;
   a radial recess is formed by two opposing side surfaces of two adjacent magnetic induction blocks, respectively, and a portion of the outer side of the annular ring is surrounded by the two opposing side surfaces;
   the portion of the outer side of the annular ring forms an innermost end of the radial recess;
   a boss is disposed on the middle of the innermost end and protrudes towards an opening of the radial recess;
   the boss comprises a top part and a bottom part;
   the top part is in a shape of a semi-sphere and comprises a top point;
   the bottom part is in a substantially cylindrical shape;
   the top part is disposed on the bottom part;
   the permanent magnet is mounted on the top point and is spaced from the innermost end by the boss, wherein two cavities are formed between the permanent magnet and the innermost end; the magnetic induction blocks at both sides of an opening of the radial recess protrude with a hook block; and
   a thickness of the rotor core is larger than that of the stator core.

2. The motor of claim 1, wherein a thickness difference between the rotor core and the stator core is 3-50 mm.

3. The motor of claim 2, wherein a thickness difference between the rotor core and the stator core is 3-20 mm.

4. The motor of claim 3, wherein a thickness difference between the rotor core and the stator core is 3-10 mm.

5. The motor of claim 1, wherein a section of an outer side surface of the magnetic induction blocks is a circular-arc line and the outer side surface employs a point with a distance deviating from the center of the central axial bore as a center of circle.

6. The motor of claim 2, wherein a section of an outer side surface of the magnetic induction blocks is a circular-arc line and the outer side surface employs a point with a distance deviating from the center of the central axial bore as a center of circle.

7. The motor of claim 3, wherein a section of an outer side surface of the magnetic induction blocks is a circular-arc line and the outer side surface employs a point with a distance deviating from the center of the central axial bore as a center of circle.

8. The motor of claim 4, wherein a section of an outer side surface of the magnetic induction blocks is a circular-arc line and the outer side surface employs a point.

9. The motor of claim 5, wherein a section of an inner side surface of each of the plurality of teeth comprises an outer arc line bending inwards in a center of the outer arc line, and outer cutting edges at both sides of the outer arc line, and the inner side surface of each of the plurality of teeth matches the outer side surface of the magnetic induction block.

10. The motor of claim 6, wherein a section of an inner side surface of each of the plurality of teeth comprises an outer arc line bending inwards in a center of the outer arc line, and outer cutting edges at both sides of the outer arc line, and the inner side surface of each of the plurality of teeth matches the outer side surface of the magnetic induction block.

11. The motor of claim 7, wherein a section of an inner side surface of each of the plurality of teeth comprises an outer arc line bending inwards in a center of the outer arc line, and outer cutting edges at both sides of the outer arc line, and the inner side surface of each of the plurality of teeth matches the outer side surface of the magnetic induction block.

12. The motor of claim 8, wherein a section of an inner side surface of each of the plurality of teeth comprises an outer arc line bending inwards in a center of the outer arc line, and outer cutting edges at both sides of the outer arc line, and the inner side surface of each of the plurality of teeth matches the outer side surface of the magnetic induction block.

13. The motor of claim 9, wherein the outer arc line is a circular-arc line.

14. The motor of claim 5, wherein
   the stator core comprises an outer edge;
   the outer edge comprises a plurality of tangent lines; and
   a mounting hole is arranged on the stator core and is disposed adjacent to the tangent lines.

15. The motor of claim 6, wherein
   the stator core comprises an outer edge;
   the outer edge comprises a plurality of tangent lines; and
   a mounting hole is arranged on the stator core and is disposed adjacent to the tangent lines.

16. The motor of claim 7, wherein
   the stator core comprises an outer edge;
   the outer edge comprises a plurality of tangent lines; and
   a mounting hole is arranged on the stator core and is disposed adjacent to the tangent lines.

17. The motor of claim 1, wherein a distance between two hook blocks arranged at the opening of the same radial recess is between $\pi D*4/(36*2P)$-$\pi D*6/(36*2P)$, D is a maximum external diameter of the rotor core, and P is a number of pole pairs of the rotor assembly.

18. The motor of claim 1, wherein a distance between the top point of the top part and the innermost end of the radial recess is larger than or equal to 2 mm.

19. A motor, comprising a stator assembly and a rotor assembly inserted into the stator assembly, wherein
   the stator assembly comprises a stator core and a winding;
   the stator core comprises a yoke and a plurality of teeth protruding inwards from the yoke;
   between two adjacent teeth formed is a winding slot;
   the winding is arranged in the winding slot, and wound on the teeth;
   the rotor assembly comprises a rotor core and a permanent magnet;
   the rotor core comprises an annular ring having a central axial bore and a plurality of magnetic induction blocks protruding outwards from an outer side of the annular ring;

a radial recess is formed by two opposing side surfaces of two adjacent magnetic induction blocks, respectively, and a portion of the outer side of the annular ring is surrounded by the two opposing side surfaces;

the portion of the outer side of the annular ring forms an innermost end of the radial recess;

a boss is disposed on the middle of the innermost end and protrudes towards an opening of the radial recess;

the boss comprises a top part and a bottom part;

the top part is in a shape of a semi-sphere and comprises a top point;

the bottom part is in a substantially cylindrical shape;

the top part is disposed on the bottom part;

the permanent magnet is mounted on the top point and is spaced from the innermost end by the boss, wherein two cavities are formed between the permanent magnet and the innermost end;

a distance between the top point of the top part and the innermost end is larger than or equal to 2 mm;

the magnetic induction blocks at both sides of an opening of the radial recess protrude with a hook block; and a thickness of the rotor core is larger than that of the stator core.

20. The motor of claim 19, wherein a section of an outer side surface of the magnetic induction blocks is a circular arc and the outer side surface employs a point with a distance deviating from the center of the central axial bore as a center of circle.

* * * * *